Dec. 5, 1961 E. S. PURINGTON 3,012,245

REMOTE CONTROL SYSTEM

Filed Oct. 3, 1945 3 Sheets-Sheet 1

INVENTOR

Ellison S. Purington

BY H. S. Grover

ATTORNEY

INVENTOR
Ellison S. Purington
BY H. S. Grover
ATTORNEY

Dec. 5, 1961 E. S. PURINGTON 3,012,245

REMOTE CONTROL SYSTEM

Filed Oct. 3, 1945 3 Sheets-Sheet 3

INVENTOR
Ellison S. Purington
BY H. S. Grover
ATTORNEY

United States Patent Office 3,012,245
Patented Dec. 5, 1961

3,012,245

REMOTE CONTROL SYSTEM

Ellison S. Purington, Gloucester, Mass., assignor, by mesne assignments, to Radio Corporation of America, New York, N.Y., a corporation of Delaware Filed Oct. 3, 1945, Ser. No. 620,150
14 Claims. (Cl. 343—225)

This invention relates to remote control systems and more particularly to a radio system which, among other uses, may be applied to a steering device for projectiles, torpedoes and other unmanned aircraft and seacraft. More generally speaking, however, my invention is capable of use in connection with any desired operations to be performed by remote control.

It is an object of my invention to provide a radio signalling system subject to automatic gain control at the receiving terminal and arranged to be operated with the least possible interference from stray influences, whether natural or caused by unwanted human intervention.

It is another object of my invention to provide a signalling system for remote control purposes which shall embody secrecy provisions such that the signals may not readily be interpreted if their reception is unauthorized.

Another object of my invention is to provide a system of remote control the receiving equipment of which cannot readily be subjected to unauthorized intelligible control. The accomplishment of this object is obtained in part by the provision of random switching of the responses to given signals. Complementary signals for left and right steering may, therefore, be of interchanged significance at one time in relation to another time.

Another object is to provide an electronic relay system responsive to a plurality of signals when simultaneously received for closing a circuit at a plurality of points.

It is still another object of my invention to provide a remote control system which includes secret signalling features and which maintains synchronism between the operation of reversing switches at transmitting and receiving terminals for reversing the significance of the signals from time to time.

In a preferred embodiment of my invention which is hereinafter fully described and illustrated in the accompanying drawings, I provide a transmitting terminal for sending out by radio signals, control pulses having left and right steering significance. A switching device driven by a spring-powered clock reverses the sense of these signals from time to time. At a receiving terminal the signals are received and detected while suitable gain control devices are rendered operative for maintaining the receiving apparatus at a suitable response level. The carrier wave which may be modulated by signals having left and right steering significance is radiated only when such signals are to be transmitted. At the receiving terminal a reversing switch is provided and driven by a spring-powered clock, the same as at the transmitter. Synchronism is maintained between the switching devices at the receiver and those at the transmitter by simultaneous starting of the two clocks at a time when an electromagnetic starting circuit may be closed through both transmitting and receiving equipments and before launching the torpedo or other craft.

My invention will now be described in more detail reference being made to the accompanying drawing in which—

*The transmitter*

Figure 1:
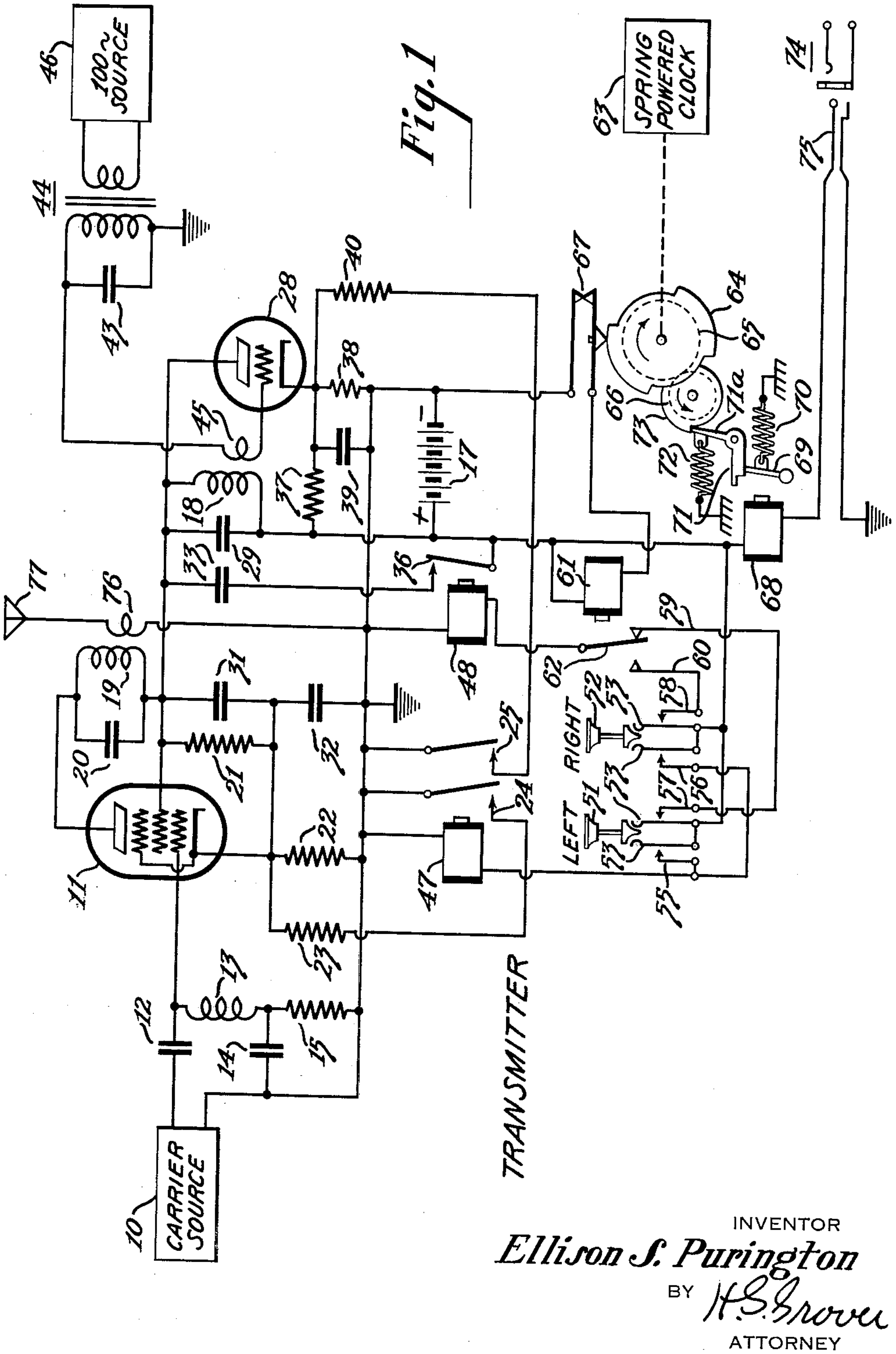
FIG. 1 shows a circuit diagram of transmitter apparatus.

Referring to FIG. 1, I show therein a carrier wave source 10 which may be of conventional type. The output from this carrier source unit is fed through a capacitor 12 to the control grid of a modulated power amplifier pentode discharge tube 11. In the inter-tube coupling arrangement between the carrier source 10 and the input circuit of the tube 11 I preferably employ a cricuit having an inductive element 13 and a resistive element 15 series connected between the control grid of tube 11 and ground. The resistor 15 is, however, shunted by a capacitor 14.

The anode and screen circuits of tube 11 are suitably designed for amplitude modulation by output from an oscillating modulator tube 28, the anode of which is directly connected to the screen grid in tube 11 and through a resonant circuit 19, 20 to the anode of tube 11. Coupled to the primary winding 19 is a secondary 76 in an antenna circuit to which an antenna 77 is connected. One terminal of the secondary 76 is grounded.

The cathode in tube 11 is connected to ground through a resistor 22 which is shunted by a capacitor 32. The screen grid and the cathode are interconnected by a resistor 21 which is shunted by a capacitor 31. The tube 11 is sufficiently self-biased by a voltage drop through resistor 22 so that normally it will not inject signals into the antenna circuit. The tube operates, therefore, as a signal amplifier only by the reduction of ohmic resistance between its cathode and ground. This reduction of resistance is obtained by the operation of a relay 47 having contacts 24 which close a circuit through a resistor 23 of relatively low value for paralleling resistor 22.

The circuit components associated with the modulator tube 28 comprise a cathode resistor 38 which is shunted by a capacitor 39, both elements being connected between the cathode and ground. The ohmic value of resistor 38 is such that normally the tube 28 does not oscillate, but by the use of a shunting resistor 40 the value of the cathode circuit resistance is reduced during signalling moments and oscillations are generated whenever contacts 25 are closed by relay 47.

The anode of tube 28 receives a positive D.C. voltage from a source 17 which is connected through a transformer winding 18. This winding is always shunted by a capacitor 29 and at times by still another capacitor 33. The circuit for capacitor 33 is normally open, however, but may be closed by the operation of a relay 48, contacts 36 of which are connected to one terminal of capacitor 33 and one terminal of capacitor 29. The introduction of additional capacitance as provided by the closing of the circuit through capacitor 33 changes the frequency of the oscillations generated in the modulator tube 28.

The control grid in tube 28 is connected to ground through a transformer winding 45 and through the secondary winding of another transformer 44. This latter transformer winding is shunted by a capacitor 43.

A low frequency source 46 has its output circuit connected to the primary winding of transformer 44. By this means the output from generator 28 is further modulated at a tone frequency rate, say of 100 cycles per second. In other words, waves of the frequency of the modulator 28 are cyclically varied in amplitude at the tone frequency rate.

Two keys or push buttons 51 and 52 are provided for transmission of left and right steering control signals. Push button 51 when depressed closes a circuit through contacts 53 and 55 for energizing relay 47, the purpose of which is to render operative the modulator tube 11 and the generator of modulation frequencies 28. Push button 51 also closes a circuit through contacts 53 and 57 which may or may not complete a circuit to relay 48 depending upon the energization of another relay 61 or the lack of such energization. The function performed by relay 48, as heretofore stated, is to change the frequency of output from the modulation generator 28 by introducing additional capacitance 33 into its tuning circuit.

The right hand push button 52 when depressed closes a circuit through contacts 53 and 56 for operating relay 47, the same as is done by the left hand push button 51. The right hand push button, however, closes another pair of contacts 53 and 58 for energizing relay 48 whenever relay 61 remains unenergized. The several contacts 53 are all connected to the positive terminal of source 17. The circuits through relays 47 and 48 are completed to ground, the negative terminal of source 17 being also grounded.

By tracing the circuits through the contacts of the two push buttons 51 and 52 it may readily be seen that relay 47 is energized regardless of which button is depressed. Relay 48 is operated by one or the other of the push buttons for the purpose of sending a characteristic signal having left or right steering significance. Furthermore the sense of the signals is transposed by causing relay 48 to be energized at times by the left push button and at times by the right push button.

The transposition relay 61 is operated under control of clock mechanism which includes a spring-powered clock mechanically connected to the shaft of a cam 64. Riding on the periphery of this cam is one of a pair of contact springs 67. These springs when closed complete a circuit from the negative terminal of source 17 through the winding of relay 61 and thence to the positive terminal of source 17. As the cam 64 rotates the contacts 67 are alternately closed and opened at such times as are provided by engagement of the lower contact with raised and depressed arcs of the cam periphery. The pattern of the cam 64 is made exactly like that of a similar cam which is incorporated in the clock control mechanism of the receiving equipment. The reversal of sense of the signals is, therefore, rendered simultaneous at transmitting and receiving stations.

In order to start the two clocks in synchronism a starting mechanism is provided which includes two magnets, one being magnet 68 in the transmitting equipment and the other being magnet **68*a* (FIG. 3) in the receiving equipment. It will be assumed that these two magnets 68 and 68*a* may be series connected through a jack 74 and a plug 75 before launching the torpedo or other craft which is to carry the receiving equipment. Energizing current for the two starting magnets 68 and 68*a* is obtained from the source 17. Armatures 69 of these magnets will, therefore, be pulled up simultaneously at the instant when the plug 75 is injected into the jack 74**.

At both transmitting and receiving stations the armatures 69 when pulled up are locked by a latch lever 71 having a step which prevents retraction by spring 70. Lever 71 is held in locking engagement with armature 69 by means of a spring 72. Detent **71*a* which is integral with the latch 71 is pulled out of the path of a holding cam 73, thus releasing the switching mechanism for continued operation thereafter by the spring-powered clock 63. Cam 64 and a gear 65 rotate on a common shaft driven by the clock 63. Cam 73 and a gear 66 are mounted on a common shaft so that gears 65 and 66 are meshed. A step on the periphery of each cam 73 allows the clocks to rotate the two cams 64 at transmitting and receiving stations into the same angular positions where they are held until the operation of the release lever 71*a*. The two clocks 63 are sufficiently well regulated so that for the duration of the controls to be exercised over the launched craft the switching operations provided by the two cams 64 will be substantially simultaneous. Before winding the clocks for a launching of the craft and before the insertion of the plug 75 into the jack 74 the latch arms 71 may be lifted manually, if necessary, in order to release the armatures 69 and to engage the detents 71*a* against the cams 73**.

As an example of frequencies of the carrier wave and the modulations which may be employed in steering a torpedo, it is contemplated that a carrier wave of 100 megacycles may be used; the oscillating modulator 28 may be adjusted to generate, say, 70 kilocycles, when relay 48 is not energized and, say, 50 kilocycles, if relay 48 is energized for the purpose of adding the capacitance 33 to the tuning circuit of tube 28. The generator 46 may, for example, deliver a tone frequency wave of 100 cycles per second. All values stated in this paragraph, however, are for purposes of illustration only and the invention is in no way limited to apparatus which would be constructed to obtain just these frequencies. Furthermore, it is contemplated that where the need may arise the frequencies to be generated may be changed from time to time.

It is intended that in carrying out my invention cam discs 64 for any two mechanisms which are to be associated as transmitter and receiver shall be supplied in matched pairs and that different pairs of cams will be chosen for each associated transmitter and receiver. The cam pairs may also be changed from time to time for the same transmitter and receiver.

*The receiver*

Figure 2:
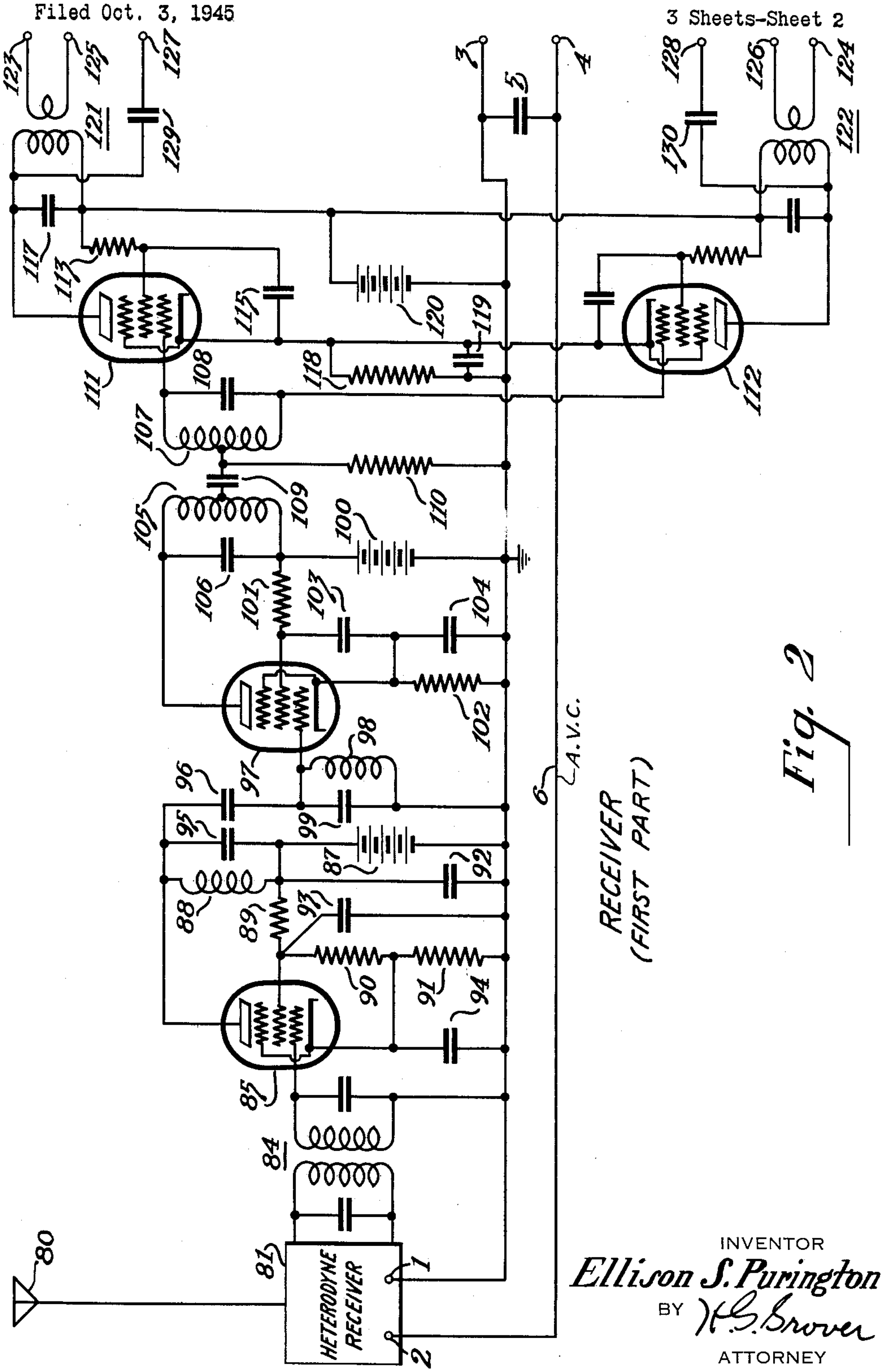
FIG. 2 shows a portion of a receiving circuit.
Figure 3:
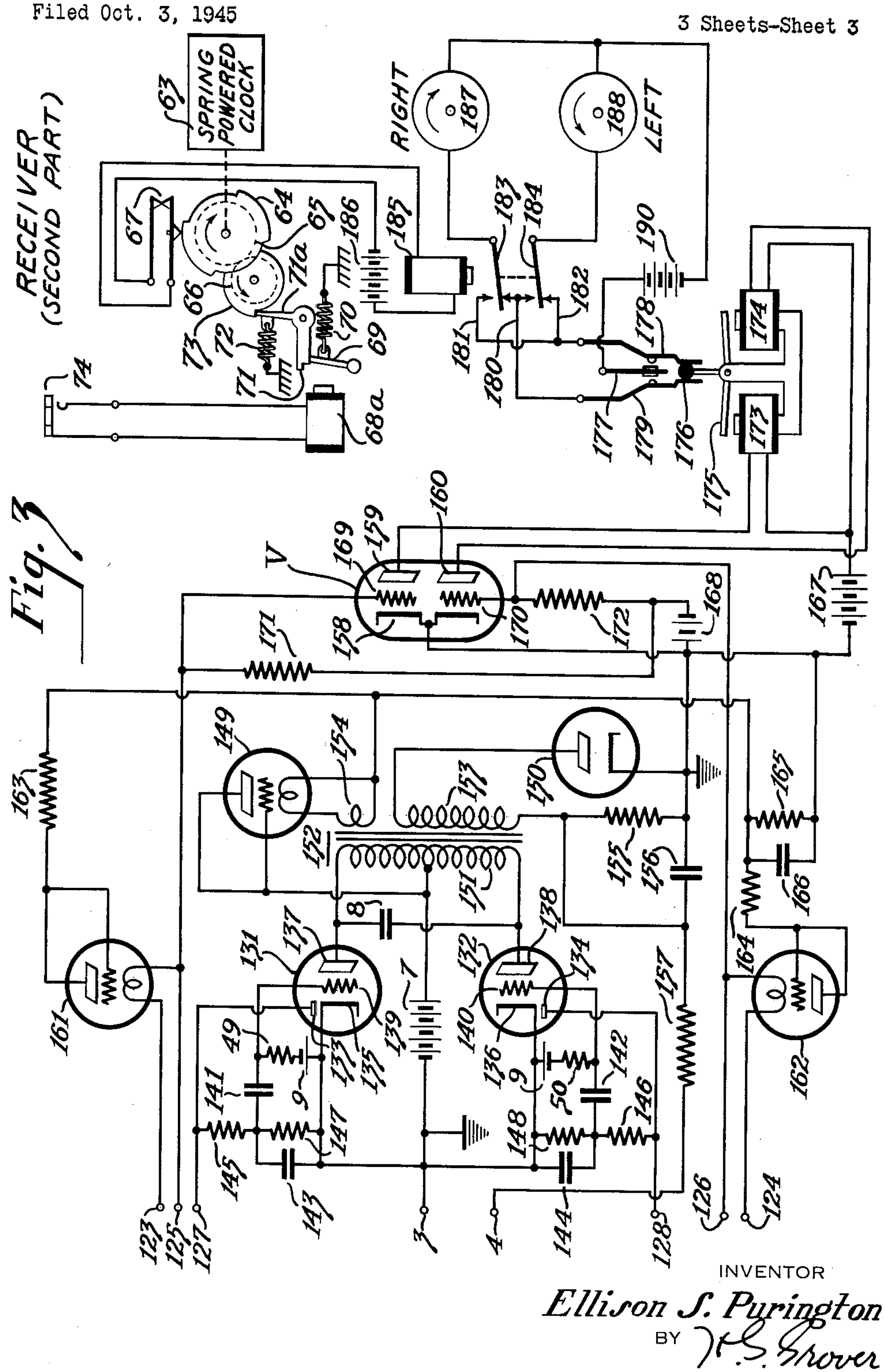
FIG. 3 shows the remainder portion of the receiver circuit, together with apparatus components essential for carrying out the invention.

A receiving circuit as shown in FIGS. 2 and 3 will now be described. The lines terminating at the right edge of FIG. 2 and the left edge of FIG. 3 will be understood to be interconnected.

Signals from the transmitting antenna of FIG. 1 are received on the receiving antenna 80 and applied to a conventional receiving circuit 81. This circuit is preferably of the heterodyne type and is pretuned to the chosen frequency of the carrier wave. A local oscillator and converter stage (not shown) are included in the unit 81. The intermediate frequency may, for example, be 5 megacycles. The receiving unit 81 is also provided with a ground terminal 1 and an A.V.C. terminal 2 by which conventional negative volume control voltage may be impressed upon the grid return of the amplifier tubes in accordance with signal strength as detected in a manner presently to be described. The output from the receiving circuit 81 is coupled through a transformer 84 to the input circuit of a detector tube 85 which is preferably of the pentode type. A battery 87 is connected on the negative side to ground and has its positive terminal connected through an inductor 88 to the anode of tube 85 and also through a resistor 89 to the screen grid of this tube. Inductor 88 and a shunting capacitor 95 form a resonant circuit tuned approximately to the higher of the two signal modulation frequencies. Resistors 89, 90 and 91 form a voltage divider for obtaining screen grid potential and a cathode potential for biasing the control grid negative with respect to the cathode. Condenser 94 is in shunt with resistor 91, condenser 93 connects the screen grid to ground, condenser 92 is connected across the battery terminals.

A pentode amplifier tube 97 is shown having its input circuit tuned by an inductor 98 in parallel with a condenser 99. This circuit is also tuned to the higher of the two signal modulation frequencies and forms the secondary of a coupled circuit system of which the above mentioned circuits 88, 95 is the primary. The primary and secondary are intercoupled through capacitor 96 the value of which is suitably chosen so that the system as a whole will pass both the higher and the lower signal modulation frequencies. The tube 97 is fed with anode potential from a battery 100 the negative terminal of which is grounded and the positive terminal of which is connected through an inductor 105 to the anode in tube 97. Battery 100 is also connected to the screen grid in tube 97 through a resistor 101. This screen grid is coupled to ground through a series-connected pair of condensers 103—104. The junction between these condensers is connected to the cathode. The cathode is also connected to ground through a resistor 102.

An intermediate tap on the inductor 105 is coupled to an intermediate tap on another inductor 107, using blocking condenser 109. These two inductors 105 and 107 are shunted by condensers 106 and 108 respectively and are coupled in transformer fashion and form a discriminator of the type shown in Seeley U.S. Patent No. 2,121,103, dated June 21, 1938. The function of this discriminator is to selectively pass either of the two modulation frequencies, say 70 kilocycles and 50 kilocycles, with considerable discrimination against other frequencies, and also to divert the two frequencies individually to different tubes 111 and 112. The features of such a discriminator are well known in the art. It is, therefore, unnecessary to further explain how the component values may be suitably chosen for efficient selection of the two signal frequencies.

The intermediate tap on inductor 107 is connected to ground through a resistor 110. In shunt with the inductor 107 is a condenser 108. The terminals of the tuned circuit 107—108 are connected respectively to the control grids in two amplifier tubes 111 and 112. The characteristics of the discriminator are so adjusted that tube 111 will be more strongly energized when the modulation of the input to the antenna 80 is in the vicinity of, say, 70 kilocycles and tube 112 will be more strongly energized when the input modulation is, say, 50 kilocycles.

Tubes 111 and 112 are amplifiers which have a common anode and screen supply battery 120. Their cathodes are connected in parallel through resistor 118 to ground. Resistor 118 is shunted by the capacitor 119. Only one of these amplifiers will be described in detail since the other is similar.

The negative terminal of battery 120 is connected to ground. The positive terminal is connected through resistor 113 to the screen grid in tube 111, this screen grid being coupled to the cathode through capacitor 115. Anode potential is supplied to the anode in tube 111 through the primary winding of a transformer 121, this primary winding having a capacitor 117 connected in parallel therewith. Elements 117 and 121 are tuned to the frequency corresponding to the best input for tube 111, say 70 kilocycles. The secondary winding of transformer 121 has terminals 123 and 125 which lead to the circuit arrangement of FIG. 3.

Likewise, a transformer 122 possesses a relation to tube 112 which is similar to that above described as to transformer 121 and tube 111 except that it is tuned to 50 kilocycles. The secondary winding of transformer 122 has terminals 124 and 126 which lead to the circuit arrangement of FIG. 3.

We come now to a description of FIG. 3. The input terminals of the circuit shown in FIG. 3 correspond to the output terminals of FIG. 2 and are like numbered. With the circuits of FIG. 1 and FIG. 2 operative as shown and described, the terminals 123, 125 and 127 may be energized from the higher radio modulating frequency, say 70 kilocycles, which in turn is further modulated, say, at 100 cycles. The lower radio modulating frequency, say 50 kilocycles, may be impressed on terminals 124, 126 and 128, which in turn is also modulated by the 100 cycle tone frequency.

The anode in tube 111 (FIG. 2) is coupled through a condenser 129 and through the terminal 127 to the diode plate 133 of a rectifier-amplifier tube 131, the cathode 135 of which is connected to ground terminal 3. The diode plate 133 is also connected through resistors 145 and 147 to the cathode 135, resistor 147 being shunted by a capacitor 143. The junction of resistors 145 and 147 is connected through a condenser 141 to the grid 139, which in turn is connected through resistor 49 to the negative end of bias cell 9, the positive end of which is connected to the grounded cathode 135. The function of this circuit is to rectify the impressed input energy of 70 kilocycles to produce therefrom a 100 cycle voltage corresponding to the amplitude modulation of that high frequency input energy, and then to impress this 100 cycle voltage on the control grid of the amplifier part of tube 131.

Diode-triode tube 132 is complementary to tube 131. The circuit components associated with tube 132 have been given even reference numbers corresponding to the odd reference numbers of the circuit associated with tube 131 in order to avoid duplication of description. The input terminals 124, 126 and 128, as stated above, are those which are to be fed by the lower signalling frequency say 50 kilocycles, which is also modulated at the same low frequency, say 100 cycles, as the above mentioned modulations of the higher signalling frequency, say 70 kilocycles. That is, when there is a signal for control purposes, either 50 or 70 kilocycles, then there will also be a 100 cycle voltage applied at the grid of tube 131 or at the grid of tube 132.

The anodes 137 and 138 of the two tubes 131 and 132 respectively are connected to each other through primary winding 151 of a transformer 152, the latter being tuned by condenser 8 to the tone modulating frequency of source 46 (FIG. 1), say 100 cycles. The center tap of winding 151 is connected to the positive end of battery 7, the negative end of which is connected to the ground terminal 3.

The transformer 152 is provided with a high impedance secondary winding 153 and a low impedance secondary winding 154. The high impedance winding 153 has one end connected to the anode of rectifier tube 150, the cathode of which is connected to ground. The other end of the secondary winding 153 is connected to ground through resistor 155, and to the A.V.C. terminal 4 through resistor 157. A capacitor 156 is connected in shunt with resistor 155.

In the operation of the circuit thus far described, current of the low frequency corresponding to source 46 of FIG. 1 is reproduced in the receiver whenever energy is radiated from the transmitter. This current is rectified and used to adjust the volume level of the receiver 81 to proper value so that the receiver circuit will not be unduly overloaded and unable to discriminate correctly against undesired stray or intentional interferences.

Two triode discharge tubes 161 and 162 serving as conduction relays are shown having directly heated filament cathodes. It is the amplified signal energy derived from the secondaries in transformers 121 and 122 (FIG. 2) which supply filament current for actuating the tubes 161 and 162. These tubes are, therefore, selectively actuated in accordance with the received signals which have steering control significance. A further requirement for actuating these tubes is that anode potential shall be supplied thereto. This is accomplished by the actuation of another relay tube 149 which is also of the triode type having a directly heated filament cathode. The grid and anode in tube 149 are interconnected, thus constituting this tube as a virtual diode. The filament is in circuit with a secondary winding 154 on transformer 152. It is thus heated by energy derived from the amplification of the 100 cycle tone frequency impressed upon either of the tubes 131 or 132. Anode potential is supplied to tube 149 from source 7. The cathode of tube 149 is connected through resistor 165 to ground, to which the negative side of battery 7 is also connected. Resistor 165 is shunted by a capacitor 166. In certain applications of the invention, however, the leakage resistance of capacitor 166 may be sufficient to serve as the virtual impedance of resistor 165. The function of resistor 165 is to discharge the condenser 166 after operation of the circuit.

Capacitor 166 is charged only when the tube 149 becomes conductive in response to the energization of its filament by the tone frequency current from the secondary winding 154. The charge built up on capacitor 166 by the incoming 100 cycle tone signal serves as a source for supplying conduction current through tube 161 or tube 162 when one of them is rendered conductive by the signal current which heats its filament.

The cathode of tube 149 is connected through resistors 163 and 164 to the anodes of conduction relay tubes 161 and 162, the cathode filaments of which are connected to input terminals 123—125 and 124—126 respectively. The cathode of tube 161 is also connected to the grid 169 of relay tube V, and the cathode of tube 162 to the grid 170. The grids 169 and 170 are connected through resistors 171 and 172 to the negative end of bias battery 168, the positive end of which is connected to ground and to the cathodes of relay tube V.

The two discharge paths in tube V serve respectively to amplify the unidirectional current derived from battery 7 which is passed by tube 149 and by either of the tubes 161 and 162, depending upon the steering control to be exercised. It will be sufficient, therefore, to describe the operation in association with the higher frequency signal (say 70 kilocycles) which is impressed upon the conduction relay tube 161.

The battery section 167 supplies anode potential to the anodes, 159 and 160. In the circuit of anode 159 is a relay winding 173. Similarly in the circuit of anode 160 a relay winding 174 is disposed. The bias battery 168 is sufficient to prevent the passage of relay current through the windings 173 or 174 to either of the anodes of tube V when the tubes 161 and 162 are not conducting.

Due to the circuit arrangement as above described there is very little chance that the condenser 166 will be usefully charged except in response to the required type of signal. In other words the output of the receiver unit 81 (FIG. 2) must contain one or the other of the selective frequency components in order to heat the filament of the conduction relay tubes 161 or 162 as the case may be, and there must also be present the tone frequency of, say, 100 cycles as a modulation of that selective frequency in order to develop sufficient current for heating the filament of tube 149 so that tube 161 or 162 will translate the controlling energy.

The space path in tube V which is controlled by grid 169 in response to signal input energy derived from the relay tube 161 provides a low impedance for current which is to energize relay winding 173 and to attract the teetering armature 175. This operation is accomplished by the input of sufficient signal voltage to overcome the negative bias on grid 169 which is normally maintained by the battery section 168.

When the armature 175 is attracted to the pole piece of relay winding 173 two movable contact springs 178 and 179 are moved to the left by the insulation button 176 which rotates through a small arc about the pivot center for the armature 175. A circuit is closed between the movable contact 178 and the centrally disposed stationary contact 177. A battery 190 has one of its terminals connected to contact 177 and supplies energy for driving either the right or the left steering motors 187 and 188 respectively. These motors are connected to a common return circuit leading to the negative terminal of the battery 190. The control circuits for the individual motors are connected to contacts 183 and 184 respectively of a relay the winding 185 of which is to be controlled by a spring powered clock mechanism similar to that which was described in connection with the transmitter.

Relay contacts 183 and 184 are associated with stationary contacts 180, 181 and 182 which are arranged to provide reversal of the circuit connections between contacts 178 and 179 on the one side and the motors 187 and 188 on the other side.

The jack 74 shown in FIG. 3 has been mentioned in the description of the transmitter in explanation of the fact that before launching the torpedo or vessel which carries the receiver the two magnets 68 and 68*a* of the transmitter and receiver respectively are to be interconnected so that the two clock mechanisms may be started simultaneously. Therefore, the plug 75 having transmitter circuit connections is inserted into the jack 74 having receiver circuit connections. At the instant of inserting the plug in the jack the two magnets are energized and the two clock mechanisms are started by the withdrawal of the detent 71*a* from the step on the cam 73. Thus the spring-powered clock 63 is enabled to rotate the cam 64 both at the transmitter and at the receiver, and in synchronism, for actuating the relay 185 from time to time in accordance with the pattern of signal sense transpositions which are to afford secrecy of the radio transmission and to render the same unintelligible in case of unauthorized reception.

*Recapitulation*

The operating procedure for starting the transposition switches at the transmitter and receiver in syncronism is as follows: The clock mechanisms at the transmitter and receiver are first wound and set so that the detents 71*a* hold their associated cams 73 at the starting position. The plug 75 is inserted in jack 74 for causing the two magnets 68 and 68*a* to be simultaneously energized. The armatures 69 of these magnets are simultaneously pulled up and locked by the latch arms 71*a*. The plug 75 may now be withdrawn from the jack 74 so that the torpedo or other craft may be launched. The contacts 67 of the clockwork mechanisms will open and close simultaneously at the transmitting and receiving stations. At the transmitting station the push buttons for left and right steering are manipulated without regard to the signalling frequencies which are to be transmitted. The carrier wave is radiated only while a push button is depressed. The control effects of the signalling frequency at the receiver are coordinated with the push button operation by virtue of the synchronous operation of the two clocks. The relay 185 at the receiver reverses the effects of the incoming signals so as to deliver the same correctly to operate the steering motors 187 and 188. In this way the transmitter button 51 will always operate the left steering motor 188 and the transmitter button 52 will always operate the right steering motor 187, but the correspondence between the control operation and the radiation characteristic of the transmitter will be changed from time to time without revealing the proper combination of transmitted signals necessary to effect a desired control operation.

What is claimed is:

1. A radio transmitting system comprising means for radiating a doubly-modulated carrier wave only when signals are to be sent, means for characterizing different signals by different frequencies constituting one modulation component, means for applying the other modulating component to said carrier wave as a constant factor of gain control for use at the point of signal reception, keying means for selecting the frequency characteristic which posses a given significance, and switching means for interchanging the sense of said frequency characteristics from time to time.

2. A system according to claim 1 in which said switching means is cyclically driven at a predetermined rate and means are provided for starting the switching means simultaneously with other switching means associated with a receiver.

3. In combination, a source of high frequency oscillations, an amplifier therefor, means including an oscillator for amplitude-modulating the output of said amplifier, relay means controlling the delivery of high frequency power from said amplifier, relay means for altering the frequency of said oscillator, and two control switches one of which is effective to close a circuit for actuating the first of said relay means and the other of which is effective to close circuits for actuating both of said relay means.

4. The combination according to claim 3 and including cyclically operable switching means for interchanging the functions performed by the two said control switches.

5. In a remote control system operable by radio waves which are radiated between transmitting and receiving stations only when a control operation is to be performed, means at the transmitting station for characterizing said waves as a doubly modulated carrier, wherein one of the modulation components is of fixed frequency and possesses the function of conditioning the receiving station to respond to a control signal, key-controlled relays for selecting the frequency of the other modulation component to be transmitted as a control signal, and switching means operable in accordance with a cyclically recurring timing schedule for interchanging the relation between the selected modulation frequency of the control signal and the control effect to be produced.

6. A remote control system according to claim 5 and including apparatus at the transmitting station and like apparatus at the receiving station cyclically operable as double-pole-double-throw switches and adapted to transpose from time to time the relation between the modulation frequency of the signals and the sense of the control operation to be performed.

7. In a system for translating received radio signals into selective control operations, where said signals are composed of doubly modulated carrier wave pulses, the combination of means for detecting a first modulation component of said signals, two circuit channels each appropriate to a different control operation to be performed, a discriminator circuit for directing said signals into a desired channel in accordance with the frequency of said first modulation component, two magnetic devices each operable through one of said channels respectively, and thermionic relay means responsive to the two modulation components of said signals when simultaneously detected, whereby a circuit closure is obtained through one of said channels for operating the selected magnetic device and for performing the desired control operation.

8. A remote control system having a first station including a radio transmitter, a second station including a radio receiver, keying means at said first station for selectively designating a particular control signal to be transmitted, cyclically operable switching means for transposing from time to time, the relations between each of two different ones of said control signals and the control function to be performed by each signal respectively, said switching means being provided at the first station and being duplicated at the second station, and unit-controlled starting devices associated with the switching means of both stations when brought together, whereby the operations of the switching means at the two stations when separated are caused to be synchronized.

9. A remote control system according to claim 8 and including a spring-powered clock mechanically coupled to a rotatable cam for actuating said switching means at each station, the cams at the two stations having similarly formed peripheries.

10. A remote control system according to claim 8 and including a rotatable cam actuator for the switching means at each station and magnetically releasable detents arranged to restrain said actuators from rotation, each said detent being comprised in the starting device at a respective one of said stations.

11. A remote control system comprising a transmitting station and a receiving station, means at the transmitting station for radiating a carrier wave which is modulated with signals having a selective control purport, means at the receiving station for translating said signals into control effects, cyclically operable switching devices at both stations for reversing the sense of said signals from time to time, thereby to render the same cryptic when received at an unauthorized station, and properly translatable at said receiving station, and means for simultaneously starting the cyclic operation of the two said switching devices so that their respective switching functions shall thereafter be performed in mutual synchronism.

12. A remote control system according to claim 11 and including in the last said means a single starter circuit and magnetically releasable mechanism in association with the driving gear of each of said switching devices, said starter circuit being operable upon temporarily bringing together the transmitting and receiving stations.

13. In a system for radio control of selective devices, transmitting equipment comprising a carrier wave source, two modulating frequency sources for modulating said carrier, one of said sources being of fixed frequency and the other being capable of frequency variation, the frequency component from said fixed modulating frequency source being essentially present as a modulation of the variable frequency source, keying means for simultaneously on-and-off switching of all said sources and for causing the frequency of the variable source to be so determined as to transmit a desired control signal, and means for using the modulation representing said source of fixed frequency to effect the selected control operation at the locus of said selective devices.

14. In a system for control of selective devices, transmitting equipment comprising a carrier wave source, two modulating frequency sources for modulating said carrier, one of said sources being of fixed frequency and the other being capable of frequency variation, the frequency component from said fixed modulating frequency source being essentially present as a modulation of the variable frequency source, keying means for simultaneously on-and-off switching of all said sources and for causing the frequency of the variable source to shift between values each of which represents a desired control, means for using the modulation representing said source of fixed frequency to effect the selected control operation at the locus of said selective devices, and synchronized means one at the transmitter and the other at said selective device for interchanging the relation between the frequency values and the desired control.

References Cited in the file of this patent

UNITED STATES PATENTS

| | | |
|---|---|---|
| 1,772,517 | Ohl | Aug. 12, 1930 |
| 2,057,773 | Finch | Oct. 20, 1936 |
| 2,065,826 | Roosenstein et al. | Dec. 29, 1936 |
| 2,314,707 | Katzin | Mar. 23, 1943 |
| 2,397,088 | Clay | Mar. 26, 1946 |
| 2,406,019 | Labin | Aug. 20, 1946 |
| 2,406,351 | MacNair | Aug. 27, 1946 |
| 2,443,195 | Pensyl | June 15, 1948 |
| 2,463,353 | Smith et al. | Mar. 15, 1949 |
| 2,470,970 | Benoit | May 24, 1949 |